United States Patent
Gallup et al.

(10) Patent No.: US 7,033,085 B2
(45) Date of Patent: Apr. 25, 2006

(54) FIBER-OPTIC CONNECTOR FOR RELEASABLY COUPLING AN OPTICAL FIBER TO AN OPTOELECTRONIC DEVICE AND RELATED METHOD

(76) Inventors: Kendra Gallup, 515 N. Cashmere Ter., Sunnyvale, CA (US) 94087; Jim Williams, 2530 Oak Ave., Corona, CA (US) 92880; Edwin Loy, 708 N. 1st St., Apt. 3, San Jose, CA (US) 95122; Brent Baugh, 4152 Thain Way, Palo Alto, CA (US) 94036

( * ) Notice: Subject to any disclaimer, the term of this patent is extended or adjusted under 35 U.S.C. 154(b) by 12 days.

(21) Appl. No.: 10/307,176

(22) Filed: Nov. 29, 2002

(65) Prior Publication Data

US 2004/0105626 A1 Jun. 3, 2004

(51) Int. Cl.
*G02B 6/42* (2006.01)
(52) U.S. Cl. .............................. 385/88; 385/92; 385/52
(58) Field of Classification Search ................. 385/88, 385/92, 89, 93, 139, 31, 33, 90, 53, 54, 56, 385/57, 76, 75
See application file for complete search history.

(56) References Cited

U.S. PATENT DOCUMENTS

| | | | | |
|---|---|---|---|---|
| 4,979,787 A | * | 12/1990 | Lichtenberger | 385/88 |
| 5,074,682 A | * | 12/1991 | Uno et al. | 385/93 |
| 5,127,074 A | * | 6/1992 | Watanabe et al. | 385/93 |
| 5,215,489 A | * | 6/1993 | Nakamura | 385/119 |
| 5,337,396 A | * | 8/1994 | Chen et al. | 385/92 |
| 5,588,081 A | * | 12/1996 | Takahashi | 385/90 |
| 5,631,989 A | * | 5/1997 | Koren et al. | 385/90 |
| 6,155,724 A | * | 12/2000 | Ichino et al. | 385/92 |
| 6,206,582 B1 | * | 3/2001 | Gilliland | 385/92 |
| 6,318,909 B1 | * | 11/2001 | Giboney et al. | 385/90 |
| 6,806,561 B1 | * | 10/2004 | Kondoh | 257/678 |
| 2001/0019647 A1 | * | 9/2001 | Okochi et al. | 385/78 |
| 2003/0044131 A1 | * | 3/2003 | Stewart et al. | 385/92 |
| 2004/0005124 A1 | * | 1/2004 | Gallup et al. | 385/88 |

* cited by examiner

*Primary Examiner*—Frank G. Font
*Assistant Examiner*—James P. Hughes

(57) ABSTRACT

A module for coupling to a fiber-optic cable includes an optoelectronic assembly that includes a bracket and a metal receptacle. The metal receptacle includes an attachment member operable to releasably connect the receptacle to the bracket, an alignment end operable to receive an alignment device, and a connector end operable to releasably connect to the fiber-optic cable and to orient the cable with the alignment device. The metal receptacle can suppress EMI and can typically withstand higher temperatures than most plastic materials. Thus, when subject to high temperatures, the receptacle typically will not expel gas that can fog a lens or deform. The attachment member allows one to releasably connect the receptacle to an optoelectronic assembly without fixing the receptacle to the assembly with adhesive. Thus, the receptacle can be mounted to an optoelectronic assembly quickly and without an alignment fixture.

22 Claims, 5 Drawing Sheets

FIBER-OPTIC CONNECTOR FOR RELEASABLY COUPLING AN OPTICAL FIBER TO AN OPTOELECTRONIC DEVICE AND RELATED METHOD

FIELD OF THE INVENTION

The invention generally relates to fiber-optic communication systems, and more particularly to a fiber-optic connector that releasably couples optical fibers to an optoelectronic device in a fiber-optic communication system.

BACKGROUND

Fiber-optic communication systems are commonly used for transmitting/receiving data. Because as of yet there are no practical optical computers, the data typically originates as an electrical signal that a transmitter converts into an optical (light) signal for transmission over an optical fiber. A receiver then converts the optical signal back into an electronic signal for processing of the data. More specifically, an optoelectronic light source such as a light emitter diode (LED) converts the electrical signal in the optical signal, and an optoelectronic light detector such as a photo diode converts the optical signal back into an electrical signal.

FIG. 1 is an exploded view of a conventional optoelectronic module 10 for transmitting optical signals to and receiving optical signals from a fiber-optic cable 12 that includes one or more optical fibers 14 (only one shown). The module 10 includes an optoelectronic transmit/receive assembly 16 and a fiber-optic interface 18 for releasably coupling the fiber-optic cable 12 to the assembly 16. The interface 18 includes a receptacle 20 that is typically made of plastic and that is mounted to the optoelectronic assembly 16. The receptacle 20 includes latches 22 that mate with a connector 24 for releasably connecting the cable 12 to the receptacle 20. The interface 18 also includes an alignment device 25 and lens 26 for respectively aligning a photo diode/LED 30 with the fiber 14 and for focusing the optical beam formed by the signal.

To assemble the module 10, first the lens 26 is mounted to the alignment device 25, and then the alignment device 25 is mounted to the optoelectronic assembly 16 by inserting the guide pins 28 (only one shown) into corresponding holes (not shown) in the panel 32 of the assembly 16. Next, the lens 26 is optically aligned with the component 30. Once the lens and component 30 are aligned, the alignment device 25 is fixed to the panel 32 with adhesive. Next, the receptacle 20 is mounted over and aligned with the alignment device 25 and fixed in place with adhesive. Because the optical alignment of the fiber 14 with the component 30 must be relatively precise—within microns—a fixture (not shown) is used to keep the alignment device 25 and the receptacle 20 in alignment while the adhesive cures.

Although, the module 10 is useful in many applications it may be unsuitable for certain situations as described below.

Unfortunately, because the receptacle 20 is typically made from plastic, mounting the module 10 to a system printed-circuit board (not shown) or using the module 10 for an extended period of time may damage the fiber-optic interface 18. To mount the module 10 to a board, the module 10 is typically soldered to the board. Soldering generates heat that can raise the temperature of the interface 18 in excess of 230° C. If the temperature of the receptacle 20 is high enough, the plastic can release gas or deform the connector latches 22 that releasably retain the cable 12 to the interface 18. Gas released by the plastic can fog the lens 26, which may distort or prevent an optical signal from passing between the fiber 14 and the component 30. Deformed connector latches 22 may cause the fiber 14 to misalign with the lens 26 when attached to the receptacle 20, or may altogether prevent connection of the cable 12 to the interface 18.

In addition, it is sometimes desired that the receptacle 20 suppress electromagnetic interference (EMI) generated by the circuitry (not shown) of the assembly 16. But because plastic typically cannot suppress EMI, the receptacle 20 must be appropriately modified. Typical modifications include either plating the receptacle 20 with a metal or mixing metal into the plastic material used to make the receptacle 20. These modifications, however, are typically expensive, and thus typically increase the cost of the interface 18.

Moreover, the process of mounting the receptacle 20 to the assembly 16 is not simple. Because this process entails gluing the receptacle 20 and alignment device 25 to the panel 32 using an alignment fixture (not shown), the time required to assemble the module 10 includes the time the adhesive takes to cure and the time one takes to assemble the module 10 in the fixture and remove the module 10 from the fixture. Thus, the time spent assembling and removing the module 10 from the fixture may also increase the cost of the module 10.

The module is further discussed in U.S. patent application Ser. No. 10/174,002 titled ACTIVELY ALIGNED OPTO-ELECTRONIC DEVICE and filed 17 Jun. 2002, which is incorporated by reference.

In view of the foregoing, there is a need for a fiber-optic receptacle that can withstand high temperatures, withstand use over an extended period of time, suppress EMI, and be easily mounted.

SUMMARY

In one aspect of the invention, a module for coupling to a fiber-optic cable includes an optoelectronic assembly that includes a bracket and a metal receptacle. The metal receptacle includes an attachment member operable to releasably connect the receptacle to the bracket, an alignment end operable to receive an alignment device, and a connector end operable to releasably connect to the fiber-optic cable and to orient the cable with the alignment device.

A metal receptacle can suppress EMI and can typically withstand higher temperatures than most plastic materials. Thus, when subject to high temperatures, the receptacle typically will not expel gas that can fog a lens or deform.

Furthermore, the attachment member allows one to releaseably connect the receptacle to an optoelectronic assembly without fixing the receptacle to the assembly with adhesive. Thus, the receptacle can retain other parts of the optoelectronic assembly while the adhesive fixing the other parts cure. Furthermore, the receptacle can be mounted to an optoelectronic assembly quickly and without an alignment fixture.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined only by the appended claims.

Figure 1:
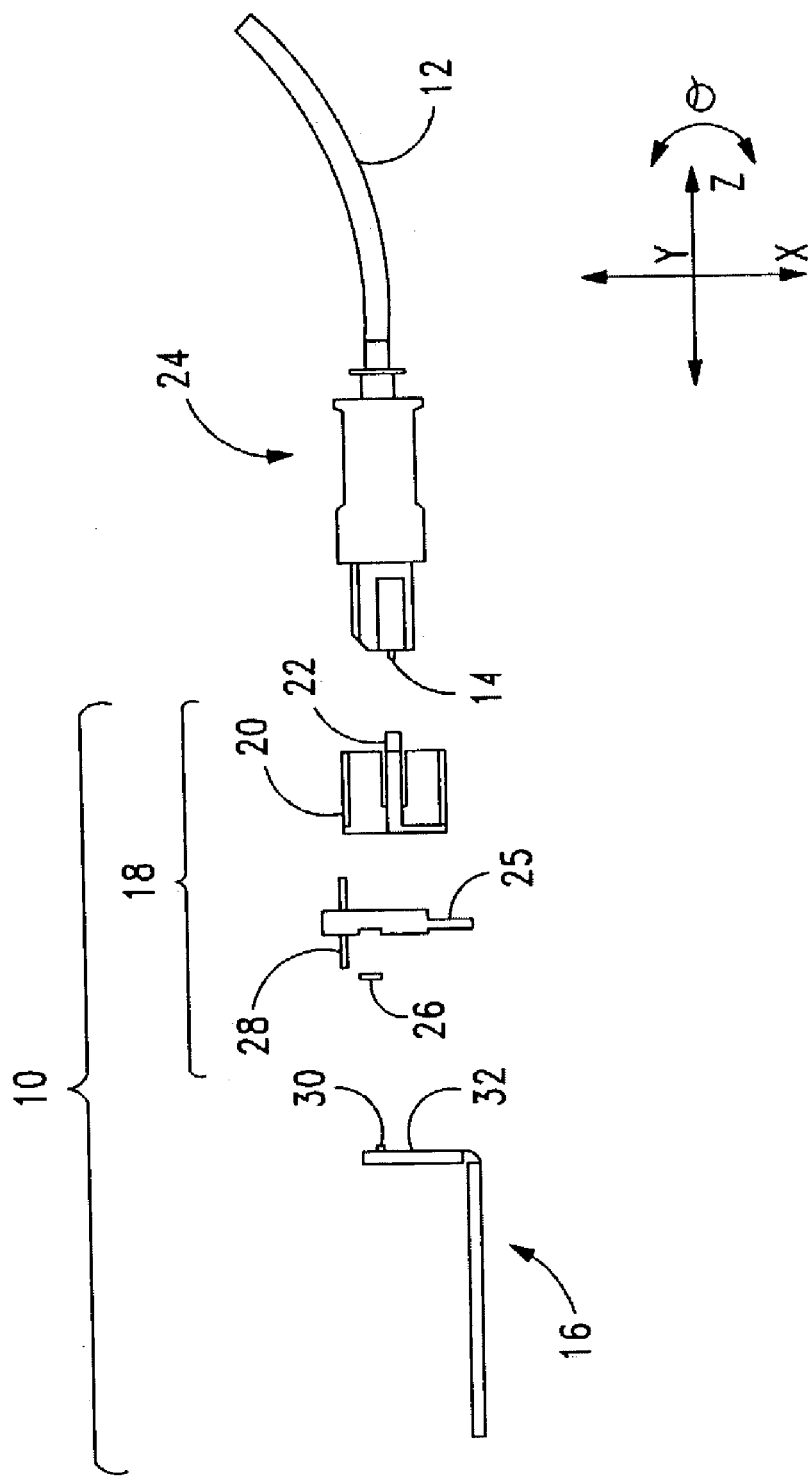
FIG. 1 is an exploded view of a conventional optoelectronic module.
Figure 2:
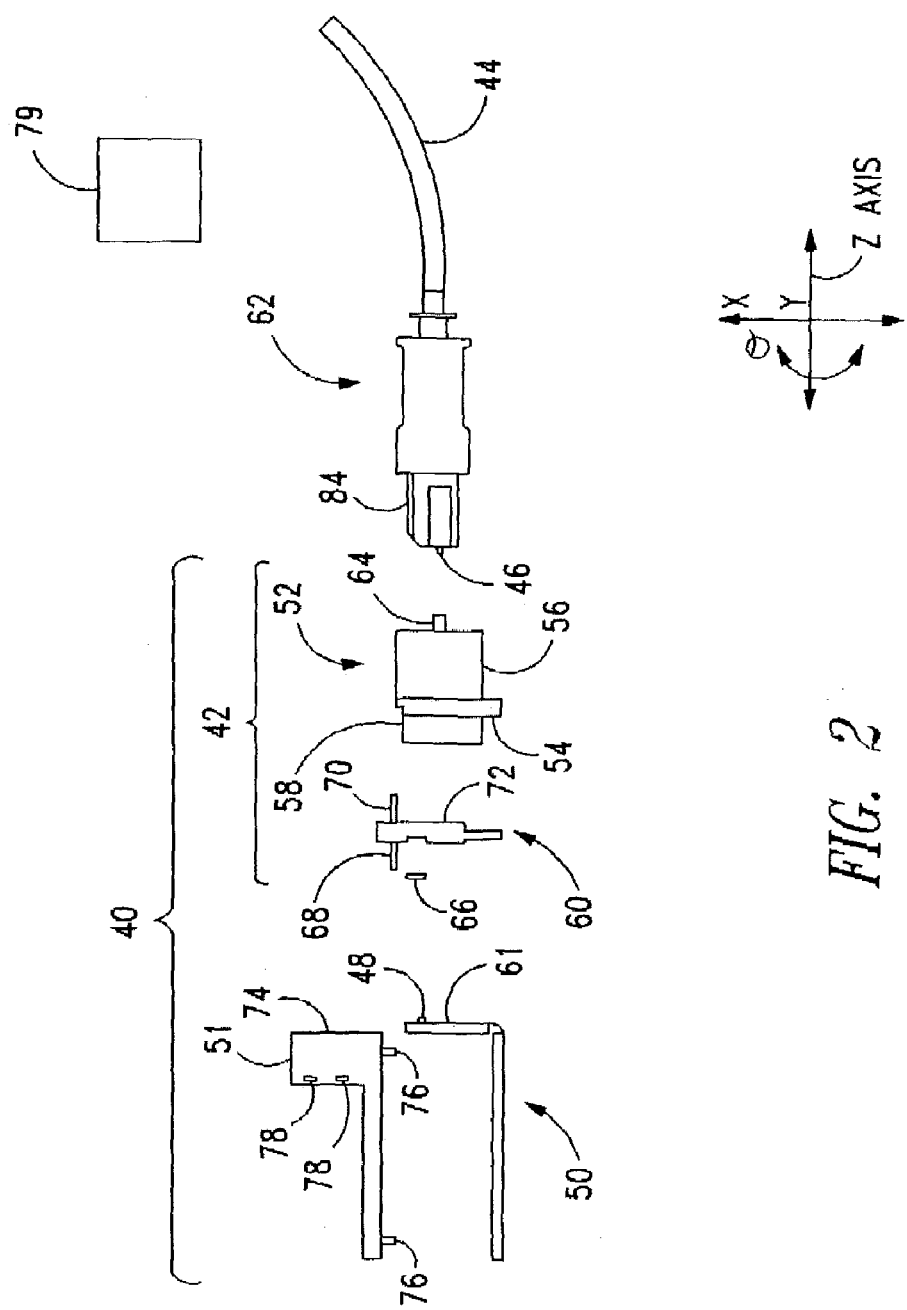
FIG. 2 is an exploded view of an optoelectronic module incorporating a receptacle according to an embodiment of the invention.

FIG. 2 is an exploded view of an optoelectronic module 40 incorporating a fiber-optic interface 42 according to an embodiment of the invention. The interface 42 releasably couples a fiber-optic cable 44, which incorporates one or more optical fibers 46 (only one shown), to the module 40 in an optically aligned position with a photo-diode/LED component 48 of an optoelectronic assembly 50. Thus, the assembly 50 can transmit and receive optical signals to and from the optical fibers 46, and consequently, other optoelectronic devices (not shown) and systems (not shown) also coupled to the cable 44.

The fiber-optic interface 42 includes a receptacle 52 (discussed in greater detail in conjunction with FIGS. 3–5) that is releasably connectable to a bracket 51, which is part of the assembly 50. The receptacle 52 is made from metal that can withstand high temperatures—typically around 230° C. and higher—and suppress EMI. In one embodiment, the receptacle 52 is made from stainless steel that includes chromium and nickel and that is commonly identified as 17-4 PH. The receptacle 52 can be fabricated using any conventional process, such as metal injection molding. Because the receptacle 52 is made of metal material, high temperatures like those frequently found when the module 40 is soldered to a circuit board (not shown), or when the module 40 is used for an extended period of time in high temperature environments, will not cause the receptacle 52 to expel gas that can fog the lens array 66 or the end of the fiber 46. Furthermore, the receptacle 52 will not deform, and thus can retain fiber 46 in an optically aligned position with the component 48.

Still referring to FIG. 2, in one embodiment, the receptacle 52 includes an alignment end 54, a connector end 56, and two attachment members 58 (only one shown) for releasably connecting the receptacle 52 to the bracket 51. With the attachment member 58, the receptacle 52 can be releasably coupled to the optoelectronic assembly 50 without adhesive. Thus, the receptacle 52 can be used as a fixture to hold other parts of the optoelectronic module 40, such as the panel 61, in position while the adhesive fixing the other parts cure. Furthermore, a separate alignment fixture is not needed and the time required to mount the interface 42 to the assembly 50 is often reduced.

The alignment end 54 receives the alignment device 60 and coarsely aligns the connector end 56 with the alignment device 60. The connector end 56 releasably connects the cable connector 62, which in one embodiment is a conventional optic fiber Mechanical Transfer Plug array connector (MTP), to the receptacle 52 with connector-end latches 64 that mate with the MTP connector 62. The connector end 56 also orients the cable 44 with the alignment device 60, which optically aligns the optical fibers 46 with the component 48 as discussed below. Thus, when the cable 44 is releasably connected to the module 40, the optical fibers 46 are optically aligned with the component 48.

Still referring to FIG. 2, in one embodiment the interface 42 includes the alignment device 60 and a lens array 66 mounted on the alignment device 60 for focusing the optical signals traveling to and from the fibers 46. The lens array 66 includes a number of optical elements that corresponds to the number of optical fibers 46 exposed at the end of the cable 44. Two device alignment pins 68 (only one shown) extend from a mating portion 72 and are inserted into corresponding holes (not shown) in the assembly 50 to locate the lens array 66 in close proximity to the component 48. As discussed in the U.S. patent application Ser. No. 10/174,002 (already incorporated above), the alignment device 60 is moved in the X, Y and ⊖ directions as necessary to optically align the elements of the lens array 66 with the corresponding elements of the component 48. The alignment device 60 is then fixed to the assembly 50 with adhesive.

To optically align the optical fibers 46 with the lens array 66, the alignment device 60 includes two connector alignment pins 70 (only one shown) extending from the mating portion 72. When the cable 44 is releasably attached to the receptacle 52, the connector alignment pins 70 are inserted into corresponding holes (not shown) in the MTP connector 62. The pins 70 are sized to allow very little movement of the MTP connector 62 in the X, Y, and ⊙ directions and each pin 70 includes a chamfer (not shown) on the end of the pin opposite the mating portion 72. The chamfer allows some initial tolerance in the alignment of the pins 70 with the corresponding holes of the MTP connector 62, and thus, allows the connector end 56 of the receptacle 52 to orient the fibers 46 with the alignment device 60. For example, in one embodiment, the base diameter of each pin 70 is 300 microns, and the chamfer runs from the longitudinal center of the pin 70 to the tip of the pin 70. Consequently, in one embodiment the MTP connector 62 can be initially misaligned with the alignment device 60 up to 149 microns in the X or Y directions and still become optically aligned with the alignment device 60 when the MTP connector 62 is fully inserted in the connector end 56. That is, the center of each pin 70 can be initially misaligned from the center of the corresponding hole in the MTP connector 62 by up to 149 microns, and the chamfered tips will still enter the holes. As the pins 10 are further inserted into the holes, the pins' 70 increasing diameter forces the MTP connector 62 into alignment with the device 60.

Still referring to FIG. 2, in one embodiment, the bracket 51 is also made of a metal material that can withstand high temperatures and suppress EMI. The bracket 51 includes a mating surface 74 that is fixed to the panel 61 of the assembly 50 with conventional adhesive, and four legs 76 (only two shown) that are fixed to the bottom panel of the assembly 50 with conventional adhesive. The bracket 51 also includes four bracket indentations 78 (only two shown) each matable with one of the respective bosses (not shown but discussed in greater detail in conjunction with FIG. 3) of the attachment member 58 to releasably connect the receptacle 52 to the bracket 51. The bosses are forced into respective bracket indentations by elastic deformation of the attachment member 58 when the receptacle 52 is inserted onto the bracket 51.

Still referring to FIG. 2, in one embodiment, the interface 42 includes a conductive ground clip 79 insertable over the connector end 56 of the receptacle 52 for grounding the receptacle 52. Most optoelectronic systems ground components and circuits to the case or chasis of the system. But because most receptacles are made of plastic, most cases or chasis are not designed to contact the receptacle 52 when the module 40 is mounted to the system. Consequently, a device like the grounding clip 79 may be included to electrically couple the receptacle to the case, chasis, or other ground point of an optoelectronic system.

Still referring to FIG. 2, in one embodiment, the fiber-optic interface 42 is mounted to the optoelectronic assembly 50 as follows. First, the four legs 76 of the bracket 51 are fixed to the optoelectronic assembly 50 as previously discussed. Next, the alignment device 60 is mounted to the panel 61 and the lens array 66 is optically aligned with the component 48 as previously discussed. Once the lens array 66 is optically aligned, adhesive is injected between the alignment device 60 and the panel 61 and cured to fix the alignment device 60 to the panel 61. Next, adhesive is inserted between the panel 61 and the mating surface 74 of the bracket 51. The receptacle 52 is then connected to the bracket 51 and holds the panel 61 in place. A temporary spring (not shown) is placed between the receptacle 52 and the panel 61 to press the panel 61 toward the mating surface 74 while the adhesive cures. After the adhesive cures, the temporary spring is removed. Because of the attachment member 58 and the bracket indentations 78, the receptacle 52 does not have to be fixed to the assembly 50 with adhesive and then held in place with a fixture while the adhesive cures. Alternatively, the receptacle 52 can be glued to the panel 61. But again, because of the member 58 and indentations 78 no fixture is required to hold the receptacle 52 while the adhesive cures.

Figure 3:
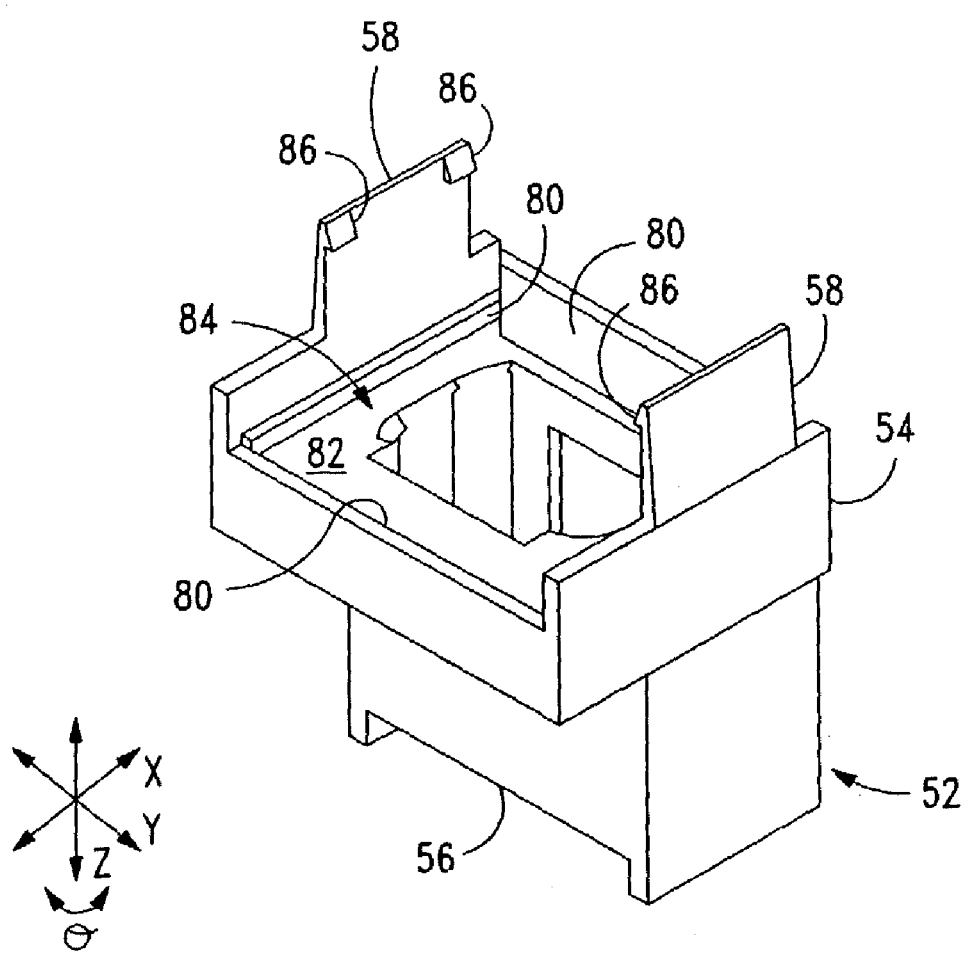
FIG. 3 is a perspective view of the alignment end of the receptacle of FIG. 2, according to an embodiment of the invention.

FIG. 3 is a perspective view of the alignment end 54 of the receptacle 52 of FIG. 2, according to an embodiment of the invention. The alignment end 54 receives the alignment device 60 (FIG. 2) and coarsely aligns the connector end 56 with the alignment device 60 in the X, Y and ⊙ directions as discussed above in conjunction with FIG.2.

The configuration of the alignment end 54 depends on the shape of the alignment device 60 (FIG.2). In one embodiment, the alignment end 54 includes an alignment-end interior wall 80 and surface 82 that define an alignment-end cavity 84 sized to receive the mating portion 72 of the alignment device 60. When the receptacle 52 is mounted to the optoelectronic assembly 50 with the alignment device 60 disposed between them, the cavity 84 permits very little movement of the mating portion 72 in the X, Y and ⊙ directions. In addition, the mating portion 72 may or may not contact the surface 82.

Still referring to FIG. 3, in one embodiment, the receptacle 52 includes two attachment members 58 each including two bosses 86 (only three shown) for mating with the respective bracket indentations 78 (FIG. 2) to releasably connect the receptacle 52 to the bracket 51 (FIG. 2). The attachment members 58 extend from the alignment end 54 away from the connector end 56. When the receptacle 52 is releasably mounted to the bracket 51, the attachment members 58 are forced apart. The resulting elastic deformation in the material of each attachment member 58 forces each boss 86 into their respective indentations 78 in the bracket 51.

Figure 4:
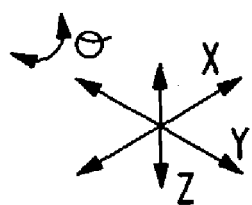
FIG. 4 is a perspective view of the connector end of the receptacle of FIG. 2, according to an embodiment of the invention.
Figure 4:
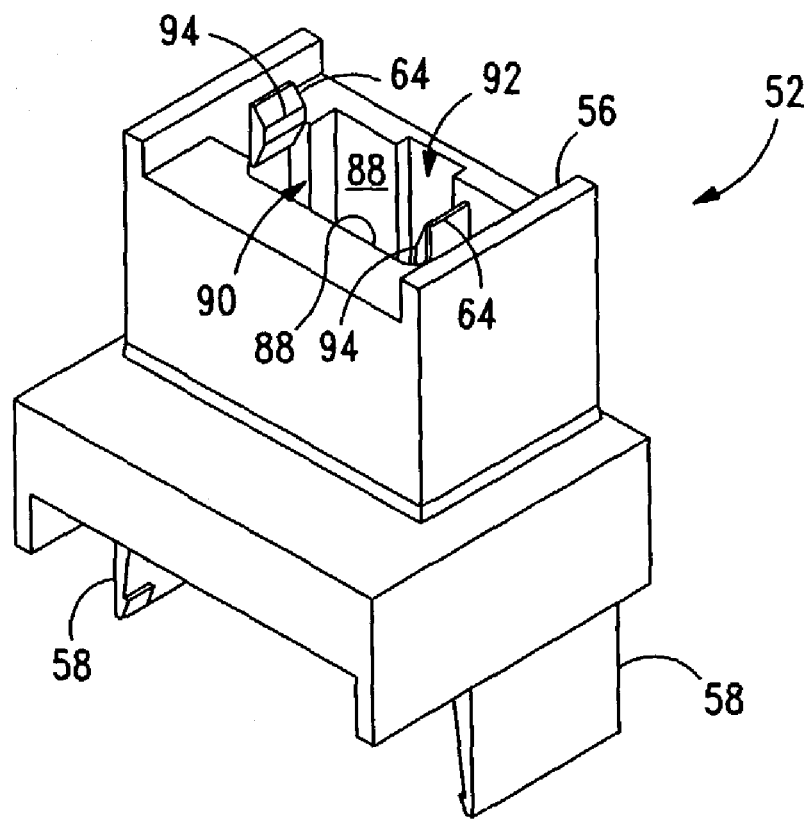
Figure 5:
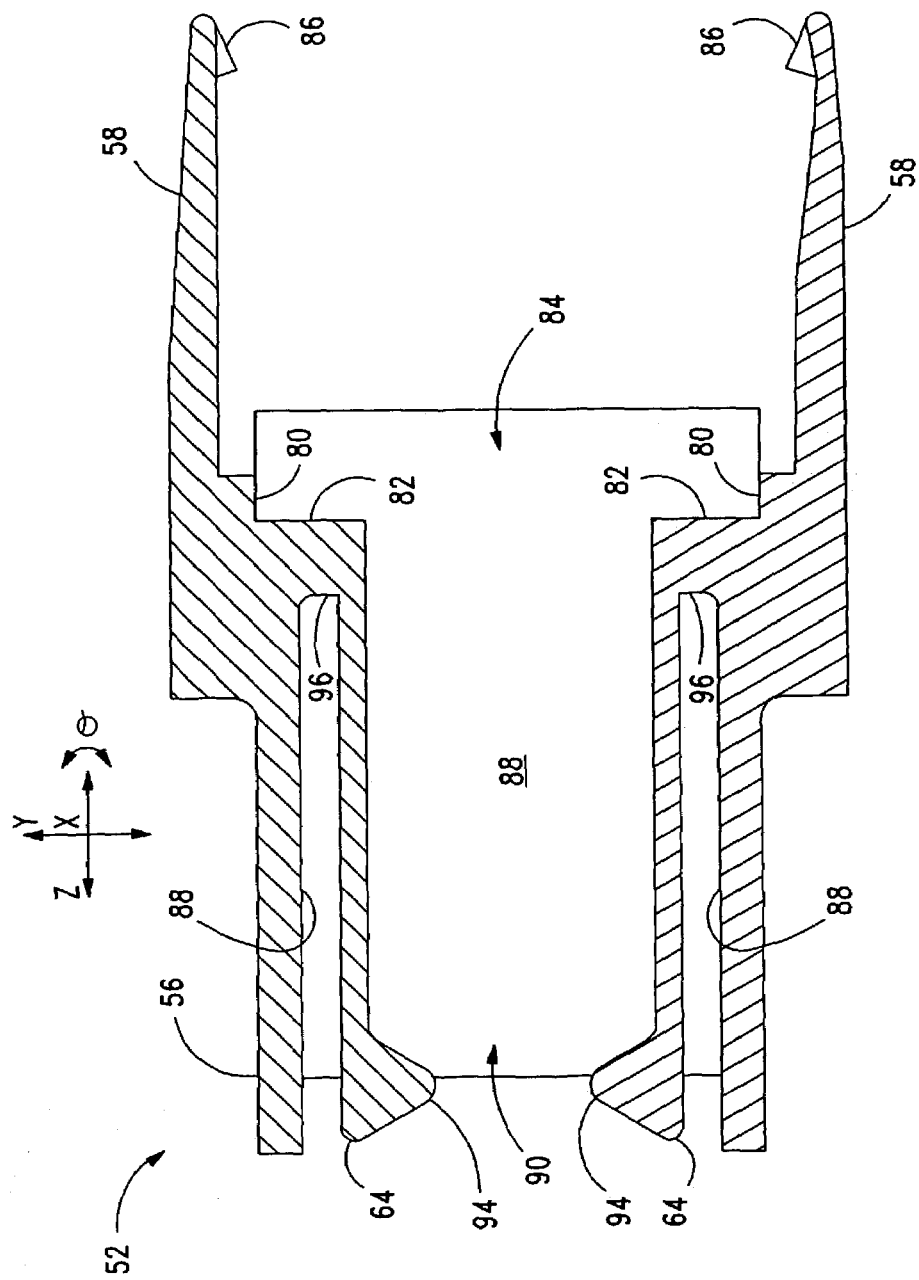
FIG. 5 is a cross-sectional view of the receptacle of FIG. 2.

FIGS. 4 and 5 are views of the receptacle 52 showing the connector end 56 according to an embodiment of the invention. FIG. 4 is a perspective view of the receptacle 52, and FIG. 5 is a cross-sectional view of the receptacle 52. The connector end 56 releasably connects the fiber-optic cable 44 (FIG. 2) to the receptacle 52, and orients the cable for optical alignment of the fibers 46 (FIG.2) with the lens array 66 (FIG.2) via the alignment device 60 (FIG. 2).

Referring to FIGS. 4 and 5, the configuration of the connector end 56 depends on the type of connector used by the cable 44. In one embodiment, the connector end 56 includes a connector-end interior wall 88 that defines a connector-end cavity 90 sized to receive the end of the MTP connector 62 (FIG. 2), and two connector-end latches 64 that mate with indentations (not shown) included in the MTP connector. To orient the cable 44 for optical alignment, the connector-end-cavity 90 is sized to permit little movement of the MTP connector 62 in the X, Y, and ⊙ directions. Furthermore, the connector-end cavity 90 includes a groove 92 sized to mate with a key (84 in FIG. 2) on the MTP connector 62 when the MTP connector is inserted into the connector-end cavity 90. Thus, the connector end 56 of the receptacle 52 will receive the MTP connector only if the MTP connector 62 is properly oriented with the alignment device 60.

Still referring to FIGS. 4 and 5, in one embodiment, the connector-end latches 64 are disposed in the connector-end cavity 90 and each includes a tooth 94 that mates with a respective indentation included in the MTP connector 62. When the MTP connector 62 is inserted into the connector-end cavity 90, the connector-end latches 64 are forced toward the connector-end interior wall 88. The resulting elastic deformation in the material of the connector-end latches 64 forces each tooth 94 into their respective indentations in the MTP connector 62. Thus, the MTP connector 62 can be releasably connected to the receptacle 52.

Referring to FIG. 5, in one embodiment, the connector-end latches 64 extend from a shoulder 96 in the connector end 56 substantially parallel to the connector-end interior wall 88, and the tooth 94 on each latch faces the tooth 94 of the other connector latch 64. When the MTP connector is inserted into the connector-end cavity 90, the MTP connector 62 contacts the mating portion 72 of the alignment device 60 (FIG. 2) to align the optical fibers 46 (FIG. 2) with the lens array 66 (FIG. 2) in the Z direction. That is, the alignment device 60 spaces the fibers 46 a proper distance from the lens array 66.

What is claimed is:

1. A metal receptacle for coupling a fiber-optic cable to an optoelectronic assembly, comprising:
   an alignment end operable to receive an alignment device, the device being disposed between the fiber-optic cable and the optoelectronic assembly when the receptacle couples the fiber-optic cable to the optoelectronic assembly;
   an attachment member extending from the alignment end and operable to releasably connect the receptacle to the optoelectronic assembly; and
   a connector end operable to releasably connect to the fiber-optic cable and to orient the cable with the alignment device.

2. The metal receptacle of claim 1 wherein the receptacle comprises stainless steel.

3. The metal receptacle of claim 2 wherein the stainless steel comprises 17-4PH stainless steel.

4. The metal receptacle of claim 1 wherein the receptacle is operable to suppress EMI.

5. An interface for coupling a fiber-optic cable to an optoelectronic assembly and for optically aligning the cable with a component of the optoelectronic assembly, comprising:
  an alignment device operable to optically align the fiber-optic cable to the component of the optoelectronic assembly; and
  a metal receptacle operable to couple the fiber-optic cable to the optoelectronic assembly and including:
    an alignment end operable to receive the alignment device, the device being disposed between the fiber-optic cable and the optoelectronic assembly when the receptacle couples the fiber-optic cable to the optoelectronic assembly,
    an attachment member extending from the alignment end and operable to releasably connect the receptacle to the optoelectronic assembly, and
    a connector end operable to releasably connect to the fiber-optic cable and to orient the cable with the alignment device.

6. The interface of claim 5 wherein the alignment device includes:
  a connector alignment pin operable to optically align the fiber-optic cable to the alignment device by inserting the connector alignment pin into a connector of the fiber cable; and
  a device alignment pin operable to optically align the alignment device to the component by inserting the device alignment pin into the optoelectronic device.

7. The interface of claim 5 wherein the alignment device includes:
  a connector alignment pin operable to optically align the fiber-optic cable to the alignment device by inserting the connector alignment pin into a connector of the fiber cable;
  a device alignment pin operable to optically align the alignment device to the component by inserting the device alignment pin into the optoelectronic device; and
  a lens array for focusing the optical signals traveling to and from the fiber-optic cable.

8. A fiber-optic module for coupling to a fiber-optic cable, the module comprising:
  an optoelectronic assembly that includes a bracket; and
  a metal receptacle for coupling the fiber-optic cable to the optoelectronic assembly and including:
    an alignment end operable to receive an alignment device, the device being disposed between the fiber-optic cable and the optoelectronic assembly when the receptacle couples the fiber-optic cable to the optoelectronic assembly,
    an attachment member extending from the alignment end and operable to releasably connect the receptacle to the bracket, and
    a connector end operable to releasably connect to the fiber-optic cable and to orient the cable with the alignment device.

9. The module of claim 8 wherein the receptacle is operable to mount the alignment device to the optoelectronic assembly.

10. The module of claim 8 wherein the receptacle includes two attachment members operable to releasably connect the receptacle to the bracket.

11. The module of claim 8 wherein:
  the bracket includes an indentation; and
  the attachment member extends from the alignment end away from the connector end and includes a boss insertable into the indentation for attaching the receptacle to the bracket.

12. The module of claim 8 wherein:
  the bracket includes four indentations; and
  the receptacle includes two attachment members each extending from the alignment end away from the connector end and each including two bosses, wherein each boss is insertable into a respective one of the four indentations for attaching the receptacle to the bracket.

13. The module of claim 8 wherein:
  the receptacle includes two attachment members, each extending from the alignment end and away from the connector end; and
  the alignment end includes an alignment-end interior wall that defines an alignment-end cavity disposed between the attachment members.

14. The module of claim 8 wherein the alignment end coarsely aligns the connector end with the alignment device when the alignment device is inserted into the alignment end.

15. The module of claim 8 wherein the alignment end includes an alignment-end interior wall and a surface that define an alignment-end cavity, wherein when the alignment device is inserted into the alignment-end cavity, the receptacle is aligned with the alignment device along an X, Y and ⊙ axes of alignment.

16. The module of claim 8 wherein the connector end includes a connector-end latch matable with a connector of the fiber-optic cable for releasably connecting the cable to the receptacle.

17. The module of claim 8 wherein the connector-end includes a connector-end interior wall that defines a connector-end cavity, wherein when the fiber-optic cable is inserted into the connector-end cavity, the connector-end cavity orients the cable for optical alignment with the alignment device.

18. The module of claim 8 wherein the connector end includes:
  a connector-end interior wall that defines a connector-end cavity, wherein when the fiber-optic cable is inserted into the connector-end cavity, the connector-end cavity orients the cable for optical alignment with an alignment device;
  a shoulder protruding from the connector-end interior wall; and
  two connector-end latches each extending from the shoulder parallel or substantially parallel to the connector-end interior wall and each including a tooth insertable into an indentation of a connector of the cable for releasably retaining the cable to the module.

19. The module of claim 8 further comprising a clip contacting the receptacle for grounding the receptacle.

20. An interface for coupling a fiber-optic cable to an optoelectronic assembly and for optically aligning the cable with a component of the optoelectronic assembly, comprising:
  an alignment device operable to optically align the fiber-optic cable to the component of the optoelectronic assembly and including:
    a connector alignment pin operable to optically align the fiber-optic cable to the alignment device by inserting the connector alignment pin into a connector of the fiber cable, and a device alignment pin operable to optically align the alignment device to the component by inserting the device alignment pin into the optoelectronic device; and a metal receptacle including:
an attachment member operable to releasably connect the receptacle to the optoelectronic assembly,
an alignment end operable to receive the alignment device, and
a connector end operable to releasably connect to the fiber-optic cable and to orient the cable with the alignment device.

21. A fiber-optic module for coupling to a fiber-optic cable, the module comprising:
an optoelectronic assembly that includes a bracket and an optoelectronic component;
an alignment device operable to optically align a lens of the device with the optoelectronic component along an X, Y and ⊙ axes of alignment; and
a metal receptacle including:
an attachment member operable to releasably connect the receptacle to the bracket,
an alignment end operable to receive the alignment device and that includes an alignment-end interior wall and a surface that define an alignment-end cavity, wherein, when the alignment device is inserted into the alignment-end cavity, the receptacle is aligned with the alignment device along an X, Y and ⊙ axes of alignment, and
a connector end operable to releasably connect to the fiber-optic cable and to orient the cable with the alignment device.

22. A fiber-optic module for coupling to a fiber-optic cable, the module comprising:
an optoelectronic assembly that includes a bracket having an indentation; and
a metal receptacle including:
an attachment member operable to releasably connect the receptacle to the bracket,
an alignment end operable to receive an alignment device,
a connector end operable to releasably connect to the fiber-optic cable and to orient the cable with the alignment device, and
wherein the attachment member extends from the alignment end away from the connector end and includes a boss insertable into the indentation for attaching the receptacle to the bracket.

* * * * *